UNITED STATES PATENT OFFICE.

JAMES S. HOWARD, OF SPRINGFIELD, MASSACHUSETTS, AND FREDERICK M. HILL, OF BROOKLYN, NEW YORK, ASSIGNORS, BY MESNE ASSIGNMENTS, TO THE ALUMINIUM PRODUCT COMPANY, OF NEW YORK.

PROCESS OF PRODUCING ALUMINUM.

SPECIFICATION forming part of Letters Patent No. 378,136, dated February 21, 1888.

Application filed July 12, 1886. Serial No. 207,822. (Specimens.)

*To all whom it may concern:*

Be it known that we, JAMES S. HOWARD and FREDERICK M. HILL, respectively of Springfield, in the county of Hampden and State of Massachusetts, and Brooklyn, in the county of Kings and State of New York, have jointly invented certain new and useful Improvements in the Process of Producing Aluminum, of which the following is a full, clear, and exact description.

Our invention has relation to the production of the metal aluminum (in a pure or uncombined state) from corundum, bauxite, or other material containing alumina.

Our improved process may be described as follows, taking corundum as an example of the base or ore to be treated, and bearing in mind that any other bases or ores containing alumina may be treated in an analogous manner:

We weigh out, say, one (1) pound of corundum and boil this in one and one-half (1½) pound commercial muriatic acid, continuing the boiling for about fifteen (15) minutes, and then allowing the product to gradually cool, keeping the vessel properly covered meanwhile. After the cooling is effected we mix with this product, say, one-half (½) pound of Spanish white or lime, and then evaporate the free acid by application of sufficient heat for the purpose. The mixture resulting from these operations is then ready to receive the fluxes.

The object of treating the corundum or other aluminum compounds containing iron with the muriatic acid is to purify it or them, separating the iron therefrom in the form of a chloride of iron which volatilizes during the process. The chloride of iron melts at a red heat and volatilizes at a higher temperature. A temperature of, say, 1,000° Fahrenheit, or thereabout, will be found sufficient. We afterward raise the temperature to 1,000° Fahrenheit (more or less) for the purpose of volatilizing the chloride of iron formed. The corundum or other ore or base may be treated when in a very finely-divided state or otherwise.

The foregoing steps are only necessary when the aluminous ores contain iron.

By the above-named addition of the lime, Spanish white, or carbonate of lime (commonly called "whiting") a larger yield of aluminum is produced than is possible without it. The application of heat to the mixture secures the volatilization of the chloride of iron, and perhaps a very little of the chloride of aluminum, but not enough to cause any considerable waste.

Next we weigh out, say, one-eighth (⅛) pound pulverized charcoal, one and one-half (1½) pound fluor-spar, one-eighth (⅛) pound salenixum, (bisulphate potassium,) and one-fourth (¼) pound cryolite. These constitute the fluxes, and we mix them thoroughly with each other and with the mixture above described, and place all in a black-lead crucible which has previously been lined with Spanish white or lime, alumina, or magnesia. Then we take, say, one-half (½) pound chloride of tin, chloride of antimony, or chloride of nickel, or any other chlorides of metals, (though the chloride of tin is preferred,) and place it on top of the mixture in the lined crucible above explained, and over this again we place, say, one-fourth (¼) pound chloride of sodium. Grain tin or other metals may be employed very successfully instead of the chloride of tin.

We next place the crucible, with its contents, in the furnace, the crucible being tightly covered, and raise the heat by gradual stages up to the melting-point of wrought-iron, (2,980°,) or more if possible, (say 4,000°,) and maintain this heat for about two or three hours, more or less, according to circumstances. The contents of the crucible must be stirred four or five times when the mass is in the molten state. When the mass ceases to give off fumes, or when the fumes emitted are inconsiderable, the crucible can be removed from the furnace and the contents allowed to cool down. When small crucibles are employed, the mass should be left in them to cool; but from the larger crucibles, or when conducting the operations upon a large scale, the melted mass may be turned into another vessel or mold to cool. There will result a "button" composed of aluminum, tin, and some impurities from the corundum or base or ore. This button is found in the bottom of the small crucible or at the bottom of the mold below the slag, and may be easily separated therefrom. This button in its impure state may be assayed and the amount or quantity of aluminum contained therein determined, and thus the richness or value of the ore ascertained.

The next step is to extract the aluminum from the button, and to do this we proceed as follows: We melt, say, one-fourth (¼) pound of lead or bismuth in any suitable vessel, drop the button in the melted lead, stirring a little, then raise the mixture to about a cherry-red heat. The lead unites with the tin, (as in common solder,) withdrawing the tin from the aluminum and such impurities as may accompany it, and sinking to the bottom of the vessel by reason of its greater specific gravity. We then skim the aluminum and impurities off the top of the lead and tin and place the product so removed upon a bed of bone-ash or the material of which cupels are made, and place the whole in a muffle-furnace, raising the heat to the desired degree. The bed, being porous and not destructible by the heat, extracts or absorbs any impurities from the aluminum, leaving the practically pure metal upon the top. (In skimming the lead small quantities of lead and tin frequently accompany the aluminum, and are absorbed by the porous bed with the impurities from the ore.) Or, instead of the above method of extracting the aluminum from the alloy of tin or other metals, or its purification, we take the alloy of tin or other metals and melt them, and by the aid of nitrate of ammonia, nitrate of alumina, or any nitrate of the alkaline metals—such as nitrate of lime, nitrate of magnesia, nitrate of barium, or nitrate of yttrium—oxidize the impurities or metals alloyed with the aluminum. In some respects we prefer the nitrate of ammonia or nitrate of alumina for purifying the aluminum and oxidizing the metals alloyed with it, as the ammonia or alumina does not form an injurious compound with the metal aluminum or attack it or its oxide.

To cast or run the aluminum into bars or ingots it has only to be removed from the bed, placed in a crucible lined with bone-ash or lime, covered with a small quantity of chloride of sodium or chloride of potassium, and melted and run or cast after the usual methods practiced in such operations.

The above proportions are stated only as preferred examples. They may be variously modified according to circumstances and conditions. The materials, ores, or bases operated upon may be any of those mentioned or any other containing alumina or aluminum.

The materials operated with may be replaced by their chemical or mechanical equivalents, the general process and the intermediate or subsidiary process or steps being followed out substantially in accordance with the foregoing explanations.

We are aware that the following briefly-mentioned processes have heretofore been proposed or practiced, and we make no claim to either or any of them. In the Corbelli and Riatti patent of October 26, 1858, a sulphate of aluminum is decomposed by use of ferro-cyanide of potassium, salt being employed as a flux. In the Frishmuth patent of August 7, 1883, the ores are converted into fluorides or double fluorides, and the aluminum is directly reduced therefrom by the action of a peculiar gas or vapor. In British Patent No. 2,247 of 1858, aluminum is extracted from double chloride or double fluoride of aluminum and sodium by aid of metallic sodium, using a mixture of salt and cryolite for a flux. In British Patent No. 4,811 of 1879, a current of electricity is employed to separate the metal and lead added to the metal, which lead it is proposed to separate by withdrawing the aluminum into the cupel. In British Patent No. 362 of 1883, ferro-silicum is mixed with fluoride of aluminum, the charge heated and decomposed; also, products in a volatile state are brought in contact with a mixture of carbonate of soda, coal, and chalk, the sodium disengaged and employed to reduced the gaseous fluoride or chloride of aluminum; also, a subsulphuret is produced and purified by liquation or sweating out. In British Patent No. 1,995 of 1883, aluminum is reduced from fluorides and chlorides by aid of sodium vapor or gas.

We make no claim herein to the invention of the process (above described) of separating aluminium from an alloy with tin, consisting, essentially, in melting the alloy in the presence of lead and separating the tin and lead by gravity from the aluminium, as we are not the first inventors thereof.

Having now fully described our invention, what we claim as new herein, and desire to secure by Letters Patent, is—

1. In the process of obtaining aluminium from its ores, boiling the ore in muriatic acid, cooling, mixing with it Spanish white or lime, then evaporating the free acid by exposure to a high degree of heat, and then raising the temperature to 1,000° Fahrenheit, more or less, for the purpose of volatilizing the chloride of iron formed, substantially as explained.

2. The process of reducing aluminous ores and obtaining an alloy of the metal, which consists in charging a lime-lined crucible with the ore which has been heated with muriatic acid and subsequently heated, as described, and with lime, charcoal, fluor-spar, cryolite, and bisulphate of potassium, covering the charge with chloride of tin and chloride of sodium, and subjecting the charge to a smelting temperature.

3. The herein-described process of producing aluminium, the same consisting in boiling in muriatic acid, cooling, mixing with Spanish white or lime, and then evaporating the free acid by heat and raising the temperature to sublime the chloride of iron, adding the fluxes and charcoal, covering the mixture with chloride of tin or a described equivalent and chloride of sodium, heating the mass, cooling and removing the alloy, melting the same in lead or bismuth, skimming off the aluminium and impurities, and purifying the same by exposure to heat upon a bed of porous material, all substantially as explained.

In testimony that we claim the foregoing we have hereunto set our hands in the presence of two witnesses.

JAMES S. HOWARD.
FREDERICK M. HILL.

Witnesses:
JOHN BUCKLER,
WORTH OSGOOD.